Nov. 2, 1943.  C. E. KERR  2,333,576
BEAN ORIENTING DEVICE
Filed July 22, 1940  4 Sheets-Sheet 4

Inventor
CHARLES E. KERR
By Philip A. Minnis
Attorney

Patented Nov. 2, 1943

2,333,576

UNITED STATES PATENT OFFICE 2,333,576

BEAN ORIENTING DEVICE

Charles E. Kerr, Hoopeston, Ill., assignor to Food Machinery Corporation, San Jose, Calif., a corporation of Delaware Application July 22, 1940, Serial No. 346,693

5 Claims. (Cl. 198—30)

The present invention relates to improvements in bean slicing machines for cutting string beans along their length into French style or shoestring beans preparatory to canning or other treatment of the same.

One object of the present invention is to provide a bean orienting device for bean slicing machines for arranging the beans lengthwise with respect to the cutting mechanism.

Another object is to provide a feeding mechanism for maintaining the beans, arranged in lengthwise position with respect to the cutting mechanism, in such relation until they enter the cutting knives of the machine.

Another object is to provide a feed mechanism for arranging and feeding irregularly shaped beans lengthwise to the cutting mechanism without clogging the machine.

Another object is to provide a feed mechanism of simple construction and efficient operation which is non-clogging and requires no attention during the operation of the cutting machine.

Other and further objects and advantages of the present invention will become apparent from the following description and drawings, in which.

Figure 1:
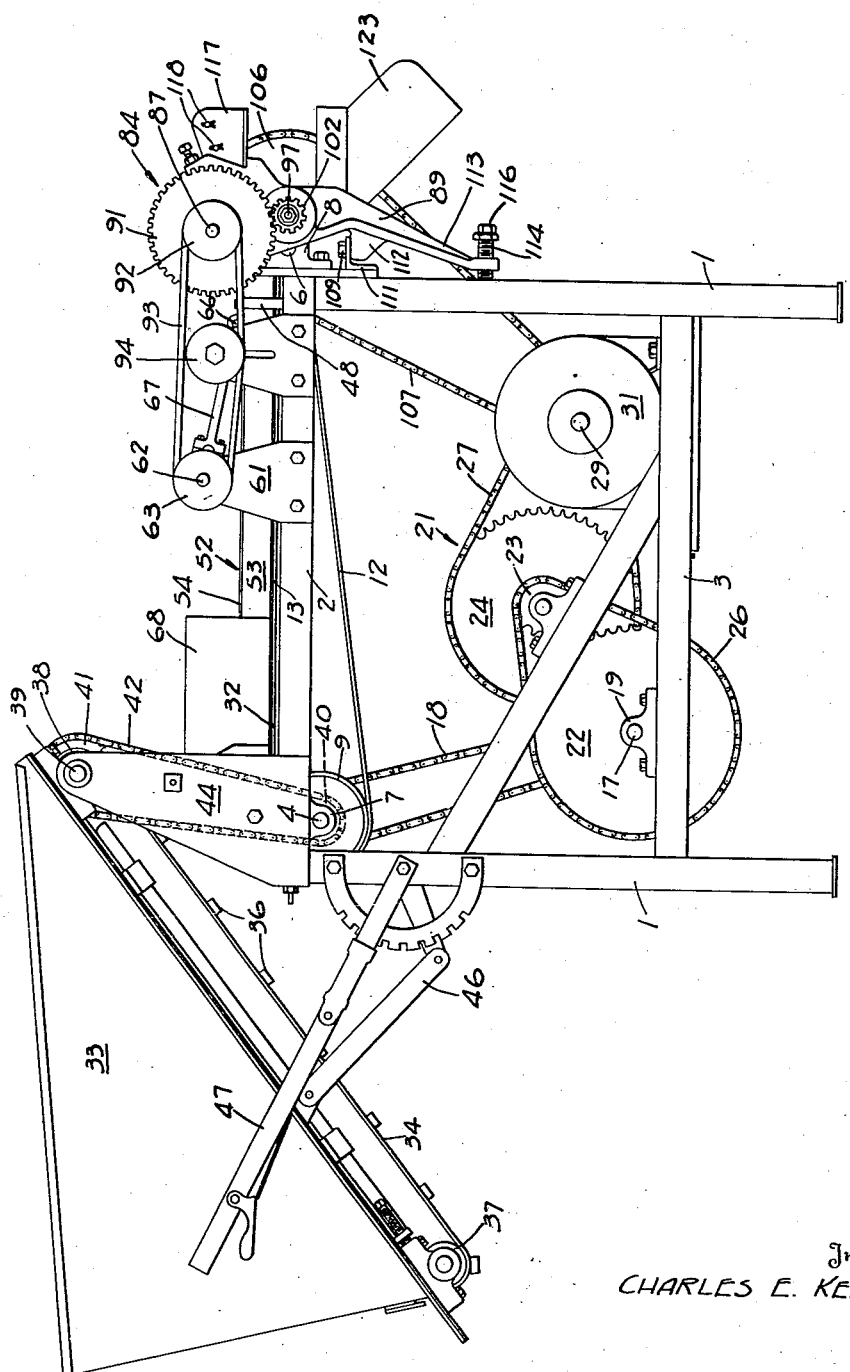
Fig. 1 is a side elevation of the bean slicing machine of the present invention.
Figure 2:
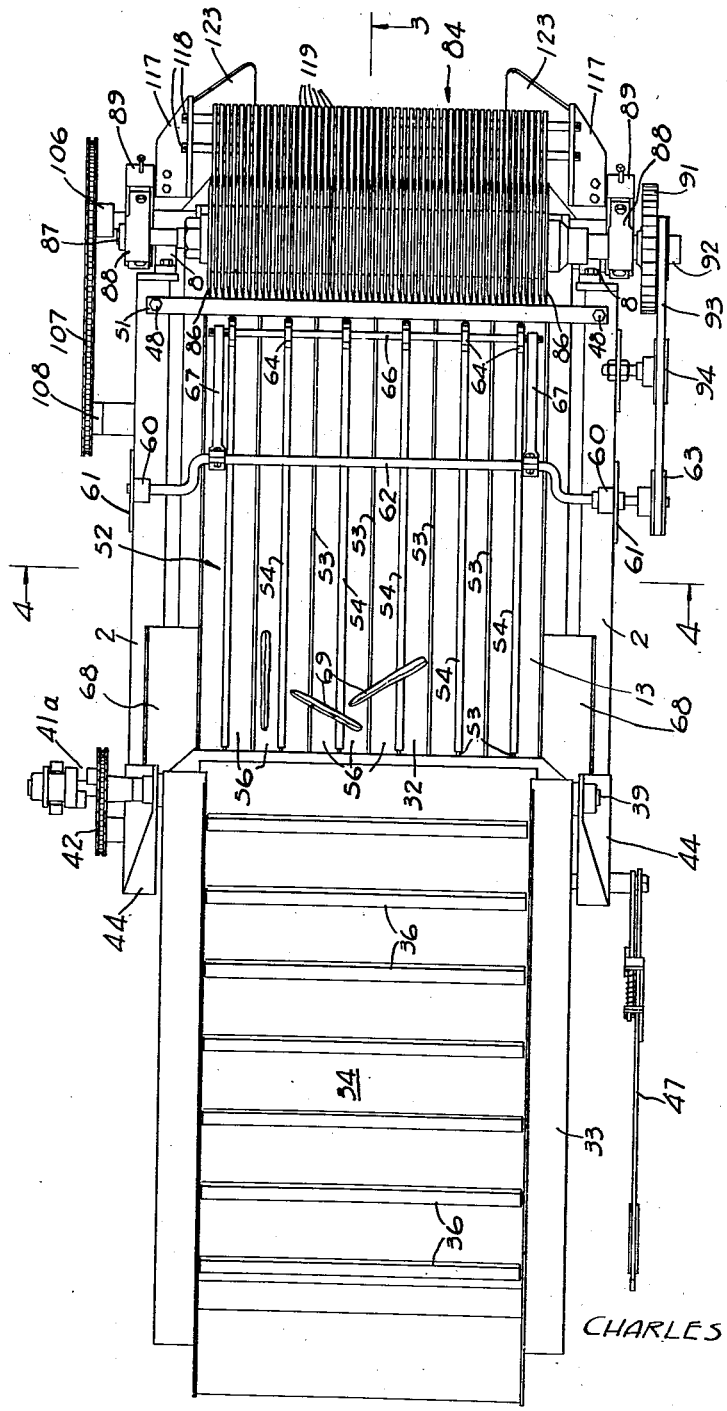
Fig. 2 is a plan view of the machine shown in Fig. 1.
Figure 3:
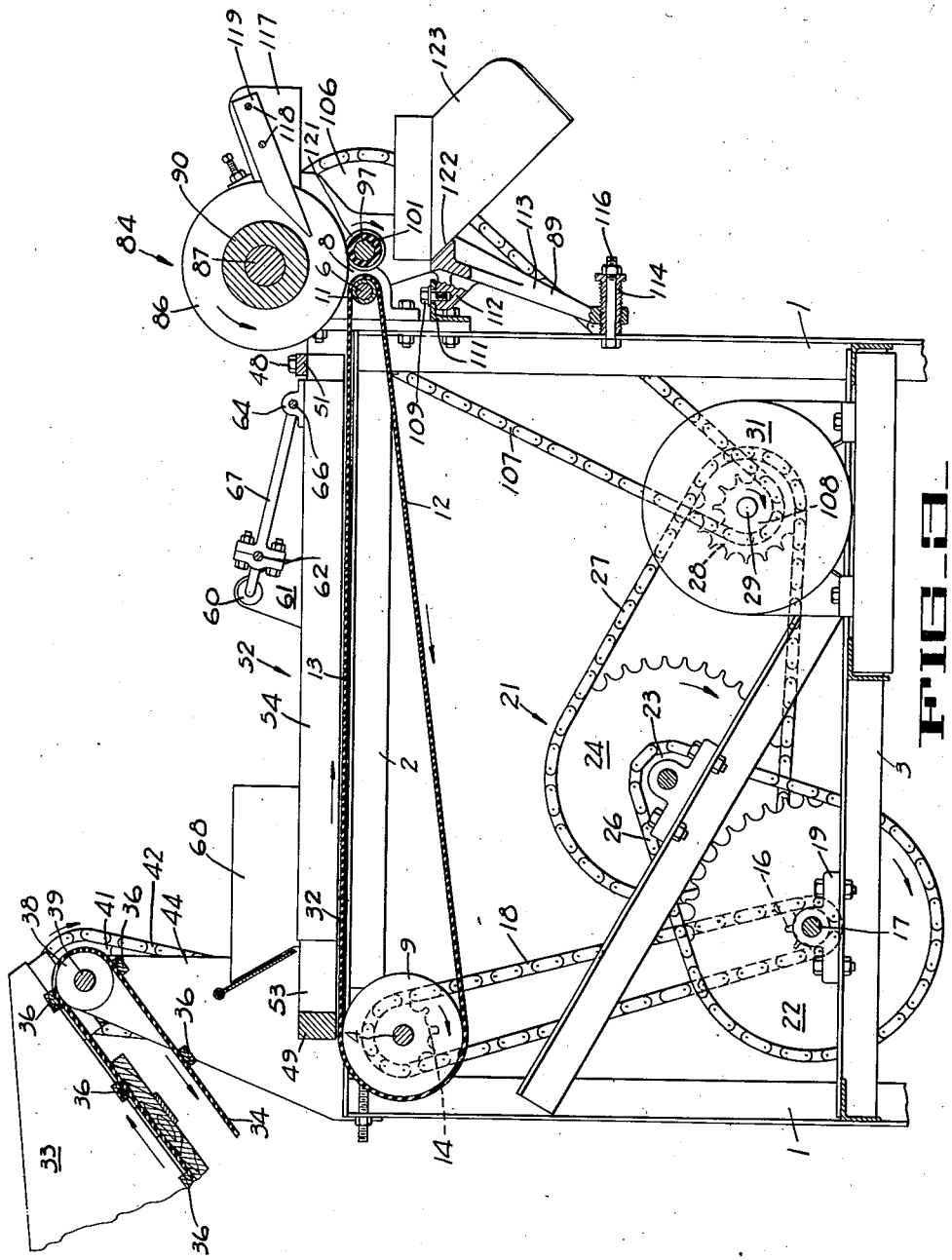
Fig. 3 is a longitudinal section taken along lines 3—3 of Fig. 2, certain portions being broken away.
Figure 4:
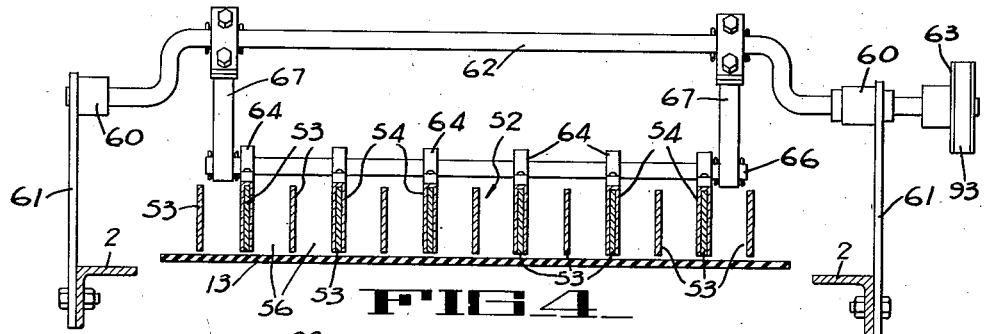
Fig. 4 is a transverse section through the feed mechanism of the machine taken along lines 4—4 of Fig. 2, with the crank shaft illustrated in another position, certain parts being omitted.

Referring now to the drawings, and especially to Figs. 1 to 3 inclusive, the frame structure of the machine consists of legs 1 and upper and lower side portions 2 and 3, respectively, between which transversely extending shafts 4 and 6 are rotatably mounted within bearings 7 and 8, respectively.

Fixed upon the shaft 4 is a roll 9 and keyed to shaft 6 is a roll 11, while an endless belt 12 is trained around the rolls 9 and 11 and extends longitudinally substantially over the entire length of the frame structure of the machine. The upper run 13 of the endless conveyor belt 12 is arranged in a horizontal position and extends in transverse direction substantially over the entire width of the machine intermediate the side members 2 and 3 of the frame of the machine.

Keyed to the transverse shaft 4 is a sprocket wheel 14 and trained around the same and a sprocket wheel 16 fixed upon a shaft 17 is a sprocket chain 18. The shaft 17 is rotatably supported within bearings 19 carried by the lower side members of the frame of the machine. The shaft 17 is driven by means of a speed reduction drive 21 consisting of sprocket wheels 22, 23, 24 and sprocket chains 26 and 27 (see Figs. 1 and 3). The sprocket chain 27 is trained around a sprocket wheel 28 keyed upon shaft 29 of an electric motor 31, or any other source of motive power.

Upon operation of the motor 31 and rotation of the shaft 29 in the direction as indicated by an arrow in Fig. 3, roll 9 will be rotated causing travel of the endless conveyor belt 12 in the direction as indicated by arrows in Fig. 3.

Mounted adjacent the receiving end 32 of the conveyor belt 12 at the front end of the machine is a hopper 33 whose bottom is formed by an endless belt 34 provided with transversely extending slats 36 (see Fig. 3). The endless belt 34 is trained around rolls 37 and 38 rotatably supported on the frame structure of the hopper 33. The roll 38 is fixed upon a transverse shaft 39 which is driven from the shaft 4 by means of sprocket wheels 40, 41 clutch 41a, and a sprocket chain 42 (see Fig. 1) so that upon operation of the conveyor belt 12 the belt 34 is driven in a direction as indicated in Fig. 3. The hopper 33 is pivotally mounted upon the front end of the frame of the machine, with the rear or discharge end thereof positioned above the receiving end 32 of the conveyor belt 12, by means of the shaft 39 and brackets 44. The bottom side of the hopper is adjustably connected to the frame structure by means of a linkage arrangement 46 provided with a control lever 47 of conventional construction. Upon movement of the lever 47 in one or the other direction the hopper 33 may be adjusted so as to increase or decrease the inclination of the belt 34 and thereby control the amount of feed of the same.

Mounted between the brackets 44 adjacent the receiving end of the belt 12 and between stud bolts 48 adjacent the discharge end thereof are transverse bars 49 and 51, respectively, to which a grid structure 52, comprising stationary grid members or partitions 53 and movable grid members 54, is secured in any convenient manner. The stationary grid members 53 extend longitudinally of the machine and are positioned above the upper run 13 of the conveyor belt 12 with their lower ends closely spaced with respect to the same. These stationary grid members 53 are spaced with respect to each other so as to form longitudinally extending feed channels 56 (see Fig. 2) of a width less than the length of the beans to freely receive the beans lengthwise thereon and to maintain them in such position.

Figure 6:
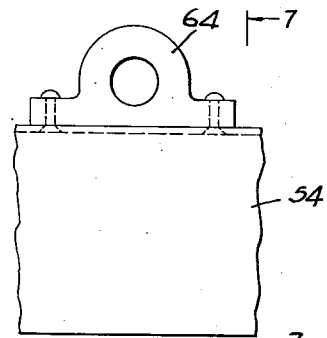
Fig. 6 is an enlarged side view of a portion of a movable grid member of the feed mechanism of the machine.
Figure 7:
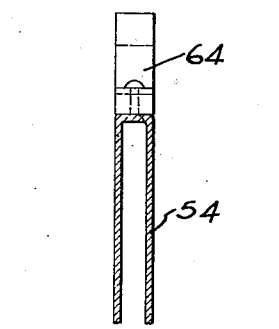
Fig. 7 is a transverse section of the movable grid member shown in Fig. 6, taken along lines 7—7 of the same.

The movable grid members 54, a detail of which is shown in Figs. 6 and 7, are of U-shaped configuration in cross section and form longitudinally extending slides slidably positioned upon every other grid member 53. The length of the movable grid members 54 is less than the length of the stationary grid members 53 so that the movable grid members may be reciprocated in longitudinal directions of the machine along their respective stationary grid members 53 with which they are associated.

Rotatably mounted within bearings 60 secured to the upper side frame members 2 of the machine by brackets 61 is a crank shaft 62, one end of which is provided with a drive pulley 63 keyed thereto. Fixed upon the movable grid members 54 are bearings 64 within which a transverse shaft 66 is received. The free ends of the transverse shaft 66 are connected with the crank shaft 62 by means of pitmans 67. These pitmans are pivotally connected to the transverse shaft 66 and crank shaft 62 in such a manner that upon rotation of the crank shaft 62 the movable grid members 54 are reciprocated along the stationary grid members 53.

Interposed between the discharge end of the hopper 33 and the grid structure 52 above the receiving end of the conveyor belt 12 is a transfer chute 68, adapted to direct the beans discharged from the hopper 33 by means of the belt 34 upon the grid structure 52 at the receiving end of the machine.

Upon operation of the belt 34 in the direction as indicated in Fig. 3 the string beans deposited therein will be elevated and discharged from the hopper 33 into the transfer chute 68 and upon the grid structure 52 above the receiving end of the conveyor belt 12, and certain ones of the string beans will fall into the feed channels 56 and automatically position themselves lengthwise with respect to the same, while other beans will not enter these channels but will lie across the stationary and movable grid members 53 and 54 in a manner as indicated at 69 in Fig. 2, one end of these beans resting upon one of the stationary grid members 53 and the other end resting upon one of the movable grid members 54. Upon rotation of the crank shaft 62 the movable grid members 54 are reciprocated in longitudinal directions with respect to the stationary grid members 53 and will effect a shifting and turning of the beans positioned transversely with respect to the grid structure 52, so that the beans will be moved into positions substantially parallel to the feed channels 56, formed by the grid members 53 and 54, and will drop into the same. In this manner all of the beans are arranged in a lengthwise position within the channels 56 and advanced from the receiving toward the discharge end of the machine by means of the conveyor belt 12, the upper run 13 of which forms the bottom wall of the channels 56.

Mounted adjacent the discharge end of the machine (see Fig. 3) is a slicing mechanism 84 which consists of a gang of slicing or cutting discs 86 positioned upon a shaft 87 rotatably mounted within bearings 88 secured to a frame 89. The cutting discs 86 (see Figs. 2 and 3) are spaced with respect to each other by means of spacers 90 and are fixed with respect to the shaft 87 for rotation therewith in any convenient manner. One end of the shaft 87 (see Figs. 2 and 3) carries a gear 91 and a pulley 92 fixed thereto, and trained around the pulley 92 and pulley 63, previously referred to, is a drive belt 93, while an idler pulley 94 adjustably supported on the frame member 2 is adapted to take up any slack in the drive belt 93.

Positioned below the shaft 87 and freely rotatable within bearings 96 supported by the supplemental frame 89 is a transverse shaft 97 provided with a cutting roll 101. This cutting roll 101 is made from soft rubber or any other similar material and is positioned in such a manner with respect to the cutting discs that the same extend a slight distance into the surface of the rubber roll 101.

Figure 5:
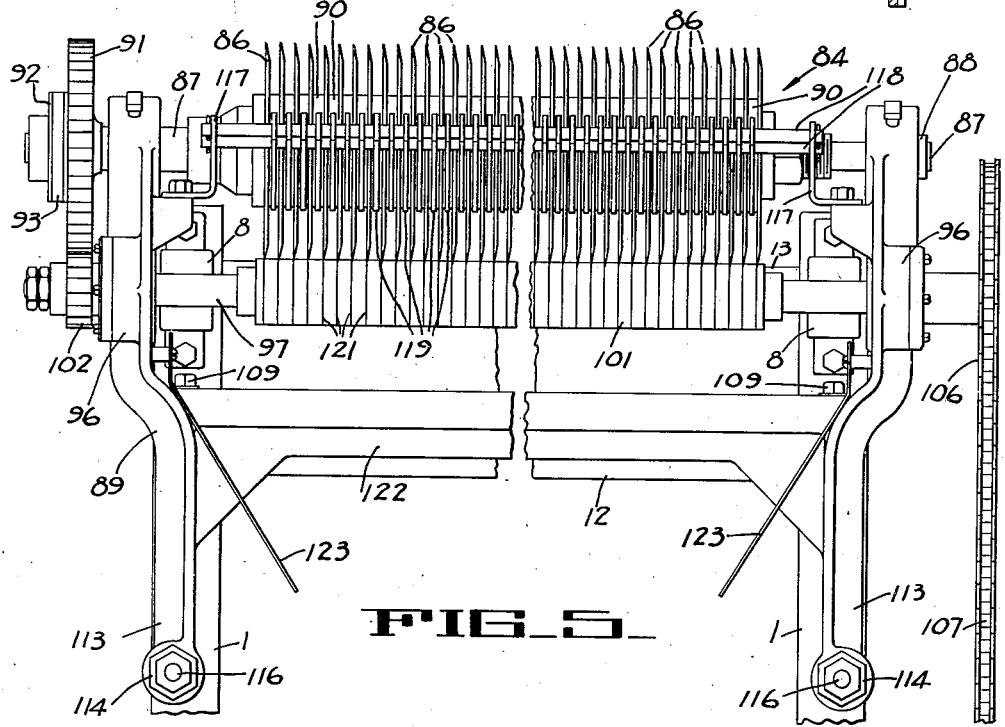
Fig. 5 is a rear end view of the machine shown in Fig. 1, the drive mechanism and lower frame structure being omitted.

Fixed upon one end of shaft 97 is a pinion 102 (see Fig. 5) which intermeshes with the gear 91 above referred to. The other end of the shaft 97 is provided with a sprocket wheel 106 which is keyed thereto and operatively connected by means of a sprocket chain 107 with a sprocket wheel 108 fixed upon the shaft 29 of the motor 31, so that upon operation of the motor 31 and rotation of the shaft 29 in the direction as indicated in Fig. 3 the cutting roll 101 and cutting discs 86 will be rotated in opposite directions, as indicated by arrows in said figure.

The frame 89 is secured to the frame structure of the machine by means of bolts 109 positioned within brackets 111 and threadedly secured within lugs 112 of the frame 89. The supplemental frame 89 is further provided with downwardly extending arms 113 which are threadedly secured to tubular screw members 114 fixed to the frame structure by means of bolts 116.

In order to facilitate adjustment of the cutting discs 86 with respect to the discharge end of the conveyor belt 12 bolts 109 and 116 are loosened and the screw members 114 are rotated in one or the other direction, so that the frame 89 is shifted with respect to the frame structure of the machine and the cutting discs are moved closer or farther away with respect to the discharge end of the conveyor belt 12.

Fixed within brackets 117 secured to the frame 89 are rods 118 which carry a plurality of strippers 119 extending into the spaces between adjacent cutting discs 86 of the machine.

The bearings 88 of the shaft 87 previously referred to herein are adjustably secured to the frame 89 so that the position of the cutting discs 86 with respect to the cutting roll 101 may be varied.

In assembling the cutting mechanism 84 of the machine the shaft 87 and cutting discs 86 are properly mounted and positioned within the frame 89 and subsequently the cutting roll 101 is installed in proper predetermined position with respect to the cutting discs 86. This cutting roll 101 is not initially grooved and therefore when the same is arranged in a manner as shown in Fig. 3 the cutting discs 86 will cut into the surface of this rubber roll 101 at their place of contact therewith.

Thereupon when the installation of the cutting mechanism is completed and the machine is operated, i. e., the cutting discs 86 and the rubber roll 101 are rotated, the cutting discs 86 will cut their own grooves into the rubber roll 101. These grooves 121 will obviously be in accurate alignment with the cutting discs 86 and any difficulty in assembly of the cutting discs and cutting roll 101 is eliminated.

Continuing now with the operation of the machine, it will be noted that while the cutting discs 86 and cutting roll 101 are rotated in the directions as indicated by arrows in Fig. 3 the beans positioned parallel to the cutting discs 86 are fed thereto by means of the conveyor belt 12. The beans therefore will be engaged by the cutting discs 86 at the discharge end of said belt and will be partially cut and advanced thereby toward the cutting roll 101 by the frictional contact between the beans and the cutting discs 86. While the beans are advanced past the cutting roll 101 they will be sliced lengthwise along their entire length and subsequently discharged into a discharge chute formed by a transverse portion 122 of the frame member 89 and deflectors 123 secured to the same. Any portions of the beans adhering to the blades 86 will be effectively removed by the strippers 119, so that clogging of the cutting mechanism is prevented.

From the above it will therefore be seen that the beans are automatically positioned in a lengthwise direction as they enter the feed channels 56 of the machine, and are maintained in such position substantially parallel with respect to the cutting discs 86 during their travel through the machine. Due to the fact that the movable grid members 54 extend over the entire height of the stationary grid members 53 and are movable substantially over the entire length of the same a clogging of the feed channels 56 is effectively eliminated. This is especially important in a case where irregularly-shaped beans are fed through the machine, which have a tendency to engage the side walls of the channels 56 and become jammed therebetween. In view of the fact that one side wall of each feed channel 56 is stationary while the other side wall thereof, formed by the movable grid member 54, is continuously reciprocated in opposite directions, the beans are maintained in lengthwise position so that even irregularly-shaped beans are freely advanced within these feed channels by means of the conveyor belt 12, and jamming or clogging of the same is prevented. Furthermore, if any foreign matter enters the cutting mechanism between the cutting discs 86 and cutting roll 101 the possibility of damage to the cutting discs is greatly minimized. In such case the soft rubber roll will be compressed in the region of the foreign objects, so that the same will pass the cutting mechanism without causing damage of the cutting discs. The wear on the cutting discs is therefore considerably reduced and the same will remain sharp for long periods in the operation of the machine.

While I have shown and described a preferred embodiment of my invention, such invention is capable of modification and variation without departing from the spirit and scope thereof as defined in the claims appended hereto.

Having thus described my invention, what I claim and desire to protect by Letters Patent is:

1. A bean orienting device comprising a conveyor, guide walls extending longitudinally of said conveyor, means mounting said guide walls in closely spaced relation with respect to said conveyor to form guide channels therewith, movable slides covering alternate guide walls and having side portions extending downwardly into and substantially to the bottoms of said channels, and means for moving the slides back and forth upon said walls to turn beans deposited crosswise upon the upper surfaces of said walls and slides into lengthwise position with respect to said channels, whereby said beans fall into said channels in such lengthwise position, and to prevent clogging of the beans in said channels.

2. A bean orienting device comprising a conveyor, a series of guide walls reciprocably mounted above and longitudinally of said conveyor, a series of stationary guide walls extending above and longitudinally of said conveyor and arranged in alternate relation with said reciprocable guide walls, said reciprocable and stationary guide walls being mounted in closely juxtaposed relation to said conveyor to form guide channels therewith, and means for reciprocating said reciprocable guide walls to turn beans deposited cross-wise upon the upper surfaces of said reciprocable and stationary guide walls into lengthwise position with respect to said channels, whereby said beans fall into said channels in such position, and to prevent clogging of the beans in said channels.

3. A bean orienting device comprising a conveyor, a series of stationary and reciprocable guide walls arranged in alternate relation above and longitudinally of said conveyor forming guide channels therewith, said stationary and reciprocable guide walls extending downwardly substantially to the bottom of the guide channels formed thereby, and means for reciprocating said reciprocable guide walls to turn beans deposited crosswise upon the upper surfaces of said reciprocable and stationary guide walls into lengthwise position with respect to said channels for reception therein and to prevent clogging of the beans in said channels.

4. A bean orienting device comprising a conveyor, closely spaced guide walls above and longitudinally of said conveyor forming guide channels therewith, slides covering alternate guide walls and extending downwardly substantially to the bottoms of the guide channels formed thereby, and means for causing relative movement of the guide walls and slides to turn beans deposited crosswise upon the same into lengthwise position with respect to the channels for reception therein in such position and to prevent clogging of the beans in said channels.

5. A bean orienting device comprising a conveyor, guide walls extending longitudinally of said conveyor, means mounting said guide walls in closely spaced relation with respect to said conveyor to form guide channels therewith, movable slides covering alternate guide walls and having side portions extending downwardly into and substantially to the bottoms of said channels, and means for causing relative movement of the slides and guide walls to turn the beans deposited crosswise upon said walls and slides into lengthwise position with respect to the channels for reception therein in such position and to prevent clogging of the beans in said channels.

CHARLES E. KERR.